United States Patent [19]

Geller

[11] Patent Number: 4,606,618
[45] Date of Patent: Aug. 19, 1986

[54] OPTICAL DEVICE WHICH IS CONVERTIBLE TO A TOY ROBOT

[75] Inventor: Steven E. Geller, Old Brookview, N.Y.

[73] Assignee: ARCO Industries, Harbour City, Hong Kong

[21] Appl. No.: 737,101

[22] Filed: May 23, 1985

[51] Int. Cl.[4] ...................... G02B 23/18; A63H 33/22
[52] U.S. Cl. .................................... 350/556; 350/545; 350/546; 446/71; 446/378; D16/133; D21/150; D21/166
[58] Field of Search ............... 350/556, 546, 545, 537, 350/555, 145, 140; 446/71, 378, 383, 384

[56] References Cited

U.S. PATENT DOCUMENTS 4,478,498 10/1984 Ohno .................................. 350/546

Primary Examiner—Jon W. Henry
Attorney, Agent, or Firm—Lilling & Greenspan

[57] ABSTRACT

A pair of binoculars which is convertible to a toy robot. The binoculars have a body to which leg tubes are attached, each leg tube having an ocular lens inserted in one end and an objective lens inserted in a second end. A focusing device is also attached to the body and is used to focus the lenses to sharply view a desired object. To convert the binoculars into a toy robot, hinged body frames on the binocular body rotate outward to form arms and the leg tubes are extendable to form legs. A cover over the torsion spring connecting the two halves of the body, rotates away from the body to form the robot's head. An upper set of notches and a lower set of notches along the outer parameter of the leg tubes are used to fit the body frame ends into and hold the toy in either the binocular form or the robot form and set of notches are used to insert the body frame ends to hold the toy in the binocular form.

4 Claims, 7 Drawing Figures

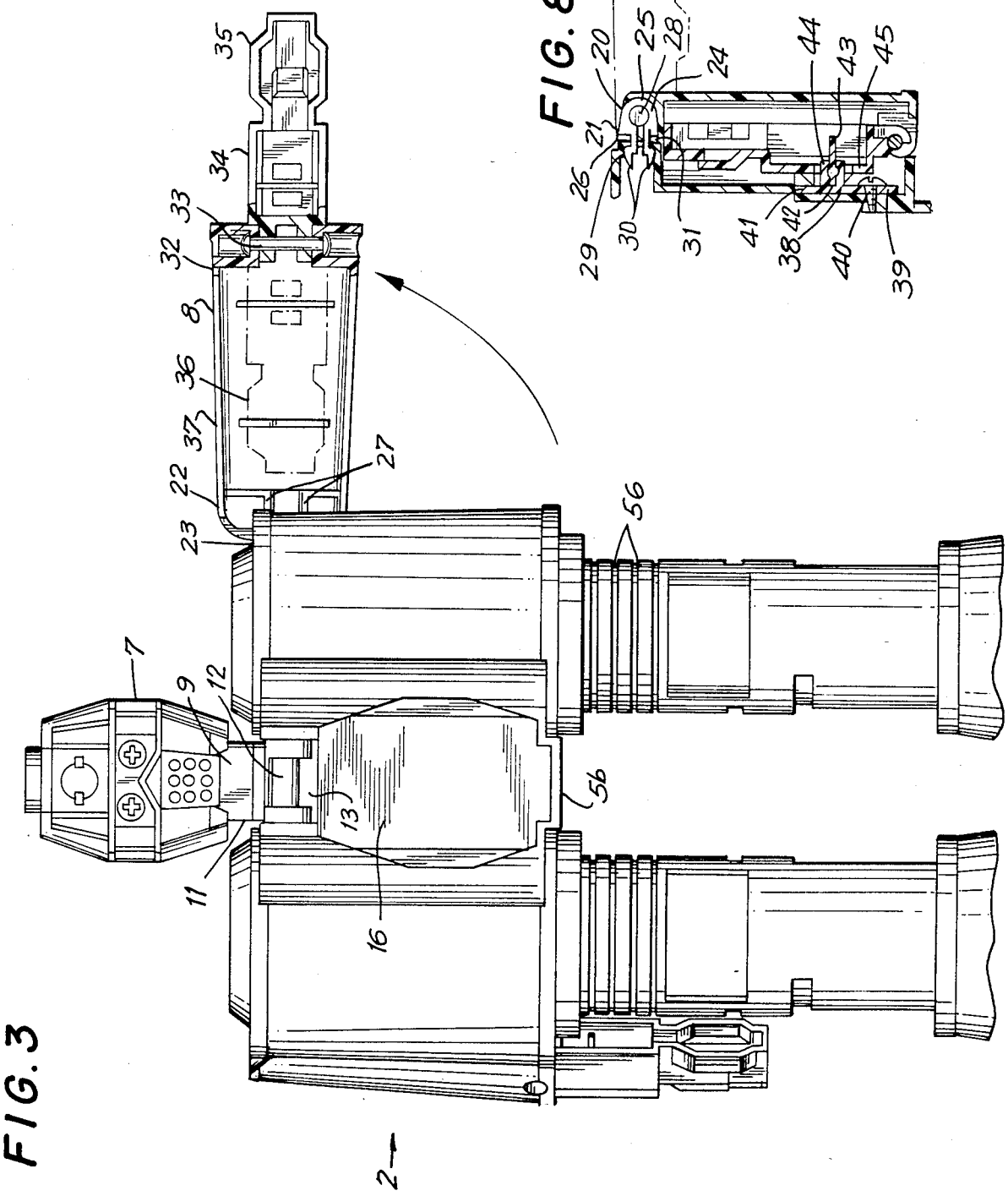
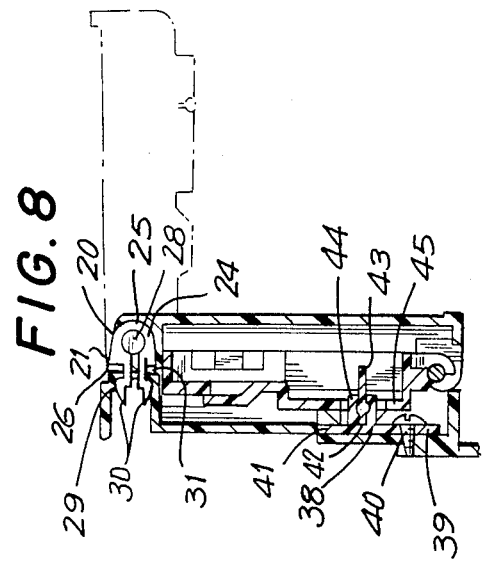

FIG. 4
FIG. 5
FIG. 6
FIG. 7
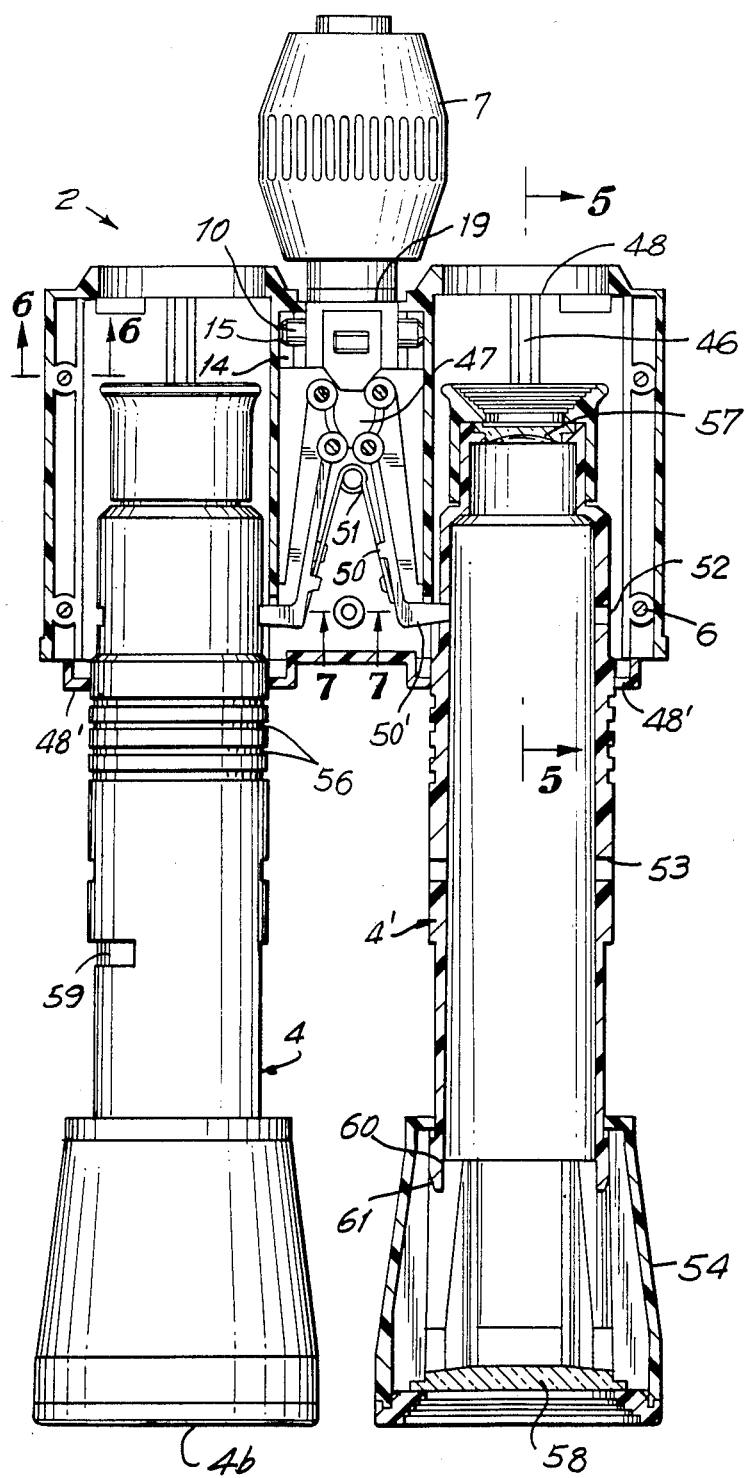
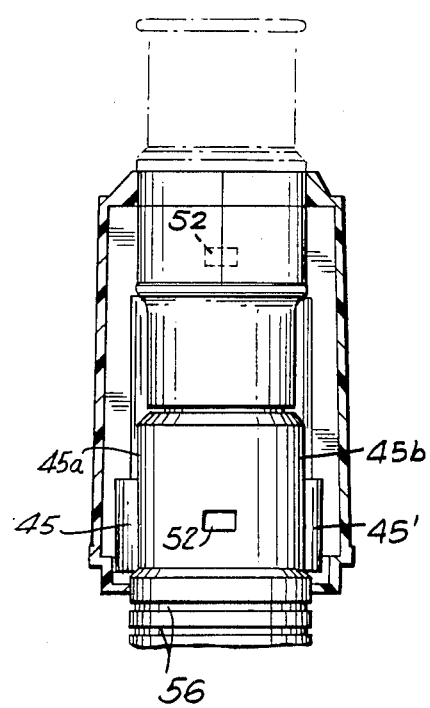
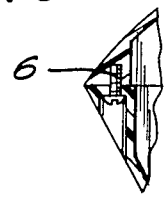
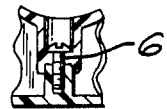

OPTICAL DEVICE WHICH IS CONVERTIBLE TO A TOY ROBOT

BACKGROUND OF THE INVENTION

With the popularity of high technological toys, new ways to present traditional play items have been sought by parents, educators and toy manufacturers. Toy binoculars have been a reliable toy for children for decades of playing enjoyment and further have the ability to educate the child through investigation and scientific inquiry. Since the problem with many toys, such as binoculars, which have an added benefit of educating a child, is the possible short attention span the child may have for the toy, the object of this invention is to provide a reliable toy with educational benefits combined with the high tech interest so popular with children today.

Although many toy manufacturers produce binoculars for children, there are no known binoculars currently manufactured which convert to form a toy robot. Therefore, a further object of this invention is to provide a more complete and imaginative playing experience. For example, a child may use the binoculars to survey a landscape for potential enemy invaders, and then convert them to a robot which could be used to ward off an attack of the potential invaders. Thus, a child can play out an entire scenario rather than having his imagination segmented by a single use for his toy and at the same time that he is playing curiosity about simple optics could be developed and a foundation for learning to be subsequently built on could be established.

SUMMARY OF THE INVENTION

The present invention consists of a toy whose moveable parts can be manipulated to transform the toy from a pair of binoculars to a robot having a body, a pair of leg tubes, a pair of arms and a rotatably attached head part, and visa versa. The leg tubes are attached to an inside wall of the toy body via a ridge and channel arrangement which permits a child to slide the tubes in a downward direction to form legs of the toy robot or in an upward direction to operate as a pair of binoculars. Further, an ocular lens inserted in one end of the leg tubes is paired with an objective lens housed in a sleeve attached to the opposite end of the leg tubes to magnify a distant object.

A torsion spring located at the axis of the binocular body permits a pair of lock levers to spring together or apart to lock the leg tubes in position in either form of the toy. To complete the body of the robot, arms and a head piece rotate in a direction away from the binocular body.

BRIEF DESCRIPTION OF THE DRAWINGS

FIG. 3 is a back view of the toy robot, with the right arm extended and with the head rotated to face the back of the toy robot.

FIG. 4 is a back view of the robot form of the toy illustrating the left side in a partial cross-sectional view and the right side in a full cross-sectional view.

FIG. 5 is a partial cross-sectional view taken along lines 5—5 of FIG. 4, illustrating in phantom lines the eyepiece of the binoculars.

FIG. 6 is a cross-sectional view taken along lines 6—6 of FIG. 4.

FIG. 7 is a cross-sectional view taken along lines 7—7 of FIG. 4.

DETAILED DESCRIPTION OF THE INVENTION

Figure 1:
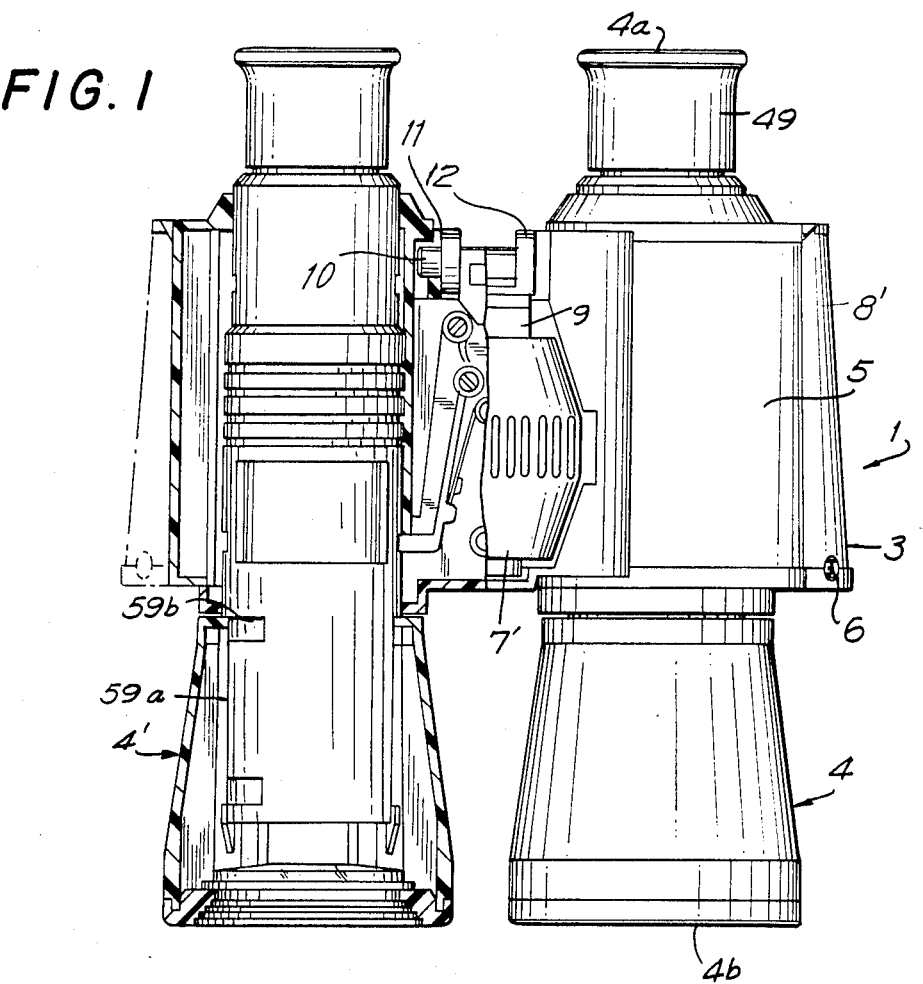
FIG. 1 is an bottom view plan of the binoculars form of the toy illustrating the right side of the binoculars in full view and the left side of the binoculars in a partial cross-sectional view.
Figure 2:
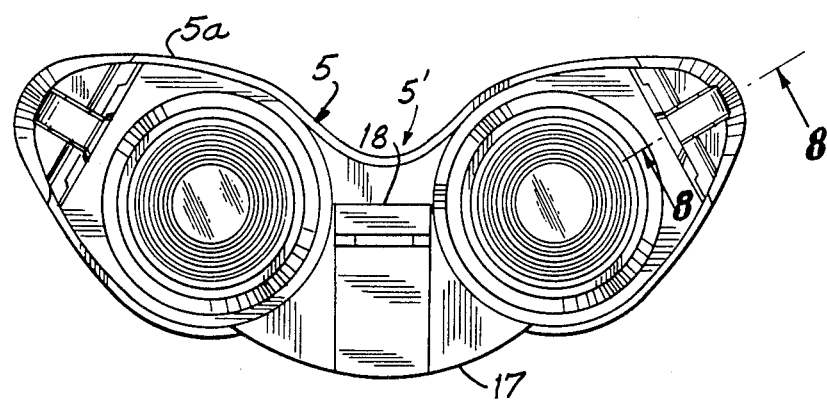
FIG. 2 is a top plan view of the robot form of the toy with the head in a collapsed position.

The body design 3 of the inventive toy is illustrated in its binoculars form 1 in FIG. 1 and in its robot form 2 in FIGS. 3 and 4. In the body design 3 of the binoculars, two telescopes 4 are coupled together in a body frame 5 with a few moveable parts. The body frame 5 consists of two pre-molded halves which are held together by conventional fasteners, such as screws 6, or any other fastener known in the art. However, any design desired may be used for the binoculars 1 including a body frame 5 consisting of two hinged telescope housings which would permit the interaxial distance between two ocular lenses to be adjusted to match each operator's individual interaxial distance.

In the robot form 2 of the convertible toy illustrated in FIGS. 3 and 4, a mechanically stiff design for the head 7, arms 8 and legs 4 is shown. It may be appreciated, however, that a more realistic robot toy may be designed, including one with more human facial features and detail in the arms and hands.

The body 3 of the inventive toy may be made of any suitable material, such as metal or plastic. Preferably, a durable plastic is used for ease of molding and manufacturing and for durability in the hands of rough child users.

The binoculars 1 are convertible into a toy robot 2 by manipulating its moveable parts such as by sliding the leg tubes 4 in a downward direction to form legs 1 rotating body covers 8' in a direction away from the body frame 5 to form arms 8 and by rotating a focusing knob 7' upward to form a head 7.

A head 7 is swivelably attached by a conventional means such as to a neck piece 9, which allows the head 7 to rotate in a circular motion for 360 degrees. The neck piece 9 consists of two protruding pegs 10 on opposing outside walls 11 of the neck piece 9 and a cutaway 12 in its center (see FIG. 4). When the neck piece 9 is press fitted into two grooves 14 on opposing inside walls 15 of a premolded area 13 of the body frame 5, the head 7 can rotate 180 degrees around the neck pegs 10 into an indented area 16 in the back side 17 of the body frame 5 at its axis 5' as shown in FIG. 1. This motion allows the head 7 to be camoflaged as a focusing knob 7' in the binoculars from 1 of the toy and thus to believably appear as a pair of binoculars 1. Further, the head part 7 is prevented from rotating more than 180° by a lip 18 on one half of the body frame which engages a back side 19 of the neck piece 9.

With the peg and groove arrangement of attaching the head 7 to the body frame 5, the need for conventional fastenings or pivot rods is eliminated. In another embodiment, a pivot rod could be inserted through the neck piece 9 to attach it to the body frame 5.

In the preferred embodiment, the arms 8 are attached to the body frame 5 by means of a wedge 20 and groove 21 arrangement. A grooved area 21 in a portion 22 of the arm 8 accommodates a wedge 20 attached to an outside wall 23 of the body frame 5 as illustrated in FIG. 8.

A bevel 24 of the wedge 20 which narrows at its outside tip 25 allows shortened pegs 26 located on the inside opposing walls 27 of the arm groove 21 to slip onto the tip 25 and into a central cavity 28 of the wedge 20 to hold the arm 8 in place. Plastic flexibility of the shortened pegs 26 and manufactured wedges 20 facilitate the operation of this arrangement.

Preferably, the wedges 20 have an extended neck 29 divided into two halves with bulbous ends 30 which allow the ends 30 to be squeezed together and inserted through an opening 31 in the body frame 5. Once inserted, the ends 30 may spring apart to hold the wedge 20 in place. Although any conventional method of attaching the arm 8 to the body frames is possible, the preferred embodiment allows the wedge 20 to rotate in a 360 degree circular motion permitting more play in the direction and positioning of the arm piece 8.

Hinged to a lower end 32 of the arm piece 8 by means of a pivot rod 33 is a forearm 34 and hand 35. In FIG. 3, the forearm 34 and hand 35 are depicted stylistically with little definition, however, any simulation of these body parts may be used. The pivot rod 33 attachment permits the forearm 34 to fold into a chamber 36 of the arm piece 8 to lie nearly flush with the chamber wall edges 37 to appear as part of the binoculars 1.

As illustrated in FIG. 8, a pre-molded plastic connecting piece 38 is attached to the body frame 5 through one of its ends 39 by a conventional screw 40 while the other end has a molded channel 42. The molded channel 42 snaps over a pre-molded rod 43 having tracks 44 on either side of an inside wall 45 of the forearm 34 to hold the forearm snugly against the body frame 5 in the toy binoculars form 1. This design 2 facilitates the convertion of the toy from one form to the other without involving expensive or complicated fastening devices.

In the illustrated form of the binoculars 1 in FIG. 1 the toy consists of two telescopes 4 held together in the body frame 5, however, it is possible to manufacture an optical device consisting of only one set of lenses in one telescope housing 4' and have the convertible head 7 and arms 8 attached to the singular telescope 4.

In the preferred embodiment, each telescope 4 contains two elongated ridges 45, 45' placed on outside opposing walls 45a, 45b of the telescope housing 4'. The ridges 45, 45' fit into channels 46, 46' located on front 47 and back 47' inside opposing walls of the body frame 5 which permit the ridges 45, 45' to slide up and down for a predetermined distance in the channels 46, 46'. The travel distance of the ridges 45, 45' is determined by lips 48, 48' located on either end of the channels 46, 46' at the perimeter on a top side 5a and a bottom side 5b of the body frame 5. When an operator pulls the telescope housing 4' in a downward direction, the ridges 45, 45' travel in their channels 46, 46' until their stopped by the lips 48, 48' of the body frame 5. In this position, an eyepiece 49 on one end of the telescope housing for prime is located entirely inside the body frame and the leg tube 4 simulates a leg of the robot 2. In contrast, from the leg tube 4 slid in an upward direction, the ridges 45, 45' travel upwardly in the channels 46, 46' until they are stopped by the lips 48, 48' at the top edge 5a of the body frame 5 and operates as an optical device.

The leg tubes 4' are locked in a desired position by means of a set of lock levers 50 which are attached to an inside wall 47 of the body frame 5. A torsion spring 51, also located on an inside wall 47 of the body frame 5, separates the lock levers 50 which move toward the axis 5' of the body frame when the spring 51 is compressed and springs back toward the leg tube 4' when the springs tension 51 is released.

As upper set of notches 52 are located on the outside opposing walls 45a, 45b of the leg tube housing for prime and are positioned equidistant between the set of ridges 45, 45', and a lower set of notches 53 are vertically displaced on the outside opposing walls 45a, 45b in a position between the upper set of notches 52 and a sleeve 54.

As the ridges 45, 45' of a leg tube 4 slide back and forth in the channels 46, 46', the leg tube housing 4' presses against a foot 50' of one of the leg levers 50 to push it toward the axis 5' of the body frame 5 and compress the torsion spring 51. When the leg tube 4 is in a desired position to form the robot 1, the set of upper notches 52 is directly in front of the foot 50' of the lock lever 50. Thus, the torsion spring 51 springs forward pushing the foot 50' of the lock lever 50 into an upper notch 52 to hold the leg tube 4 in position. Likewise, when the toy is converted to a pair of binoculars 2, the leg tube 4 is pushed upward until an eye piece 49 is above the top side 5a of the body frame 5. When the leg tube 4 is in this position, the set of lower notches 53 are positioned in front of a foot 50' of the lock levers 50 and the torsion spring 51 releases the foot 50' toward the leg tube 4 and into the positioned notch 53.

In a preferred embodiment of the toy, a set of shallow tracks 56 running circumferentially around the leg tube housing 4' are positioned between the upper and lower notches 52, 53. These shallow tracks 56 serve to regulate the speed at which the leg tubes 4 may slide in the channel 46 as the torsion action of the lock lever 50 springs the lever 50 forward into each shallow groove 56.

An ocular lens 57 is inserted into the eyepiece 49 at the top 4a of the legs 4 which is held in front of the user's eye. At the bottom 4b or base of the leg tube 4, a sleeve 54 containing an objective lens 58 is fastened onto the leg tube 4 by a notch and groove arrangement. A set of shallow L-shaped grooves 59 on the surfaces 45' of the leg tube housing 4' accommodates a set of shallow ribs 60 on the inside opposing walls 61 of the sleeve 54. The ribs 60 slide down the longer branch 59a of the L-shaped groove 59 to its corner at which point the sleeve 54 is rotated to move the ribs 60 from the longer branch 59a to the smaller portion 59b of the groove 59, thus, locking the sleeve 54 into place.

A dual function of the rib and groove arrangement is to allow the leg tube 4 to be extended while in the robot form 2 to simulate the appearance of a human leg 4 with a foot and also to allow the user to increase or decrease magnification. As the sleeve is moved down the longer groove 59a to extend the leg tube 4 the objective lens 58 is moved further away from the ocular lens 57, thus, increasing the magnification of the binoculars 1.

Magnification of distant objects is accomplished by this coupling of the ocular 57 and objective 58 lenses which serves to increase the visual angle of the observed object. One judges the size or distance of an object by the angle at which it is seen. Parallel rays from the observed object are converged through the objective lens to form an object image at the focus of the objective lens. This point also coincides with the focus of the ocular lens so that the rays emerging from the objective lens and passing through the ocular lens are again parallel and the observer sees the object under a larger visual angle. The magnification of a telescope or pair of binoculars is defined as the ratio of the focal length of the objective to that of the ocular lens. Thus, by sliding the sleeve 54 in a direction away from the ocular lens 57 the distance between the two lenses is increased and the focus of the observed object is changed, resulting in a change in the magnification of the observed object and the simulation of robot's.

I claim:

1. A toy whose moveable parts are manipulated to transform the toy between an optical device and a toy robot comprising:

(a) a housing of said optical device;

(b) at least one leg tube slidably attached to an inside wall of said housing and extending through said housing, said leg tube sliding in a first direction toward a bottom side of said housing to form a leg of the toy robot and sliding in a second direction toward a top side of said housing to operate as the optical device;

(c) a viewing means housed in said leg tube for magnifying a distant object, said viewing means having an ocular lens inserted in one end of said leg tube which is held in front of one eye to aid in viewing said distant object coupled with an objective lens attached to a second end of said leg tube which is directed toward said object to increase its visual angle and magnify the object;

(d) at least one extension member rotatably attached to a top portion of said housing unfolding from said housing to extend into an arm of said toy robot and collapsing into a position near said housing to appear as a part of the body frame of the optical device; and (e) a second extension member rotatably attached to the top portion of said housing in a manner permitting said second extension member to rotate in one direction away from said top side to form a head of the robot and rotate in a second direction toward said topside to simulate a forcusing knob of said optical device.

2. An optical device according to claim 1, wherein said leg tube further comprises a set of ridges disposed on outside opposing walls of said leg tube between an upper set of notches and a lower set of notches, said ridges permitting said leg tube to slide in said first direction and said second direction to convert the toy.

3. An optical device according to claim 2, wherein said housing comprises one side which is laterally displaced from a second side which houses a torsion spring separating a set of lock levers near its axis, said spring and lock levers serve to lock the leg tube into position as the leg of the robot when said levers spring into said upper set of notches and to lock the leg tube into position to operate as said optical device when said levers spring into said lower set of notches.

4. An optical device according to claim 1, wherein said objective lens is housed in a sleeve which is attached to said second end of said leg tube allowing a distance between said objective lens and said optical lens to be modified to change a magnification of the optical device.

* * * * *